(12) United States Patent
Von Shoultz

(10) Patent No.: US 8,464,564 B2
(45) Date of Patent: Jun. 18, 2013

(54) KEY RING WITH COMPRESSIBLE GAP

(75) Inventor: Erik Von Shoultz, Stockholm (SE)

(73) Assignee: Drosselmeyer Designgroup Aktiebolag, Stockholm (SE)

(*) Notice: Subject to any disclaimer, the term of this patent is extended or adjusted under 35 U.S.C. 154(b) by 0 days.

(21) Appl. No.: 13/635,472

(22) PCT Filed: Dec. 20, 2010

(86) PCT No.: PCT/SE2010/051431
§ 371 (c)(1),
(2), (4) Date: Sep. 17, 2012

(87) PCT Pub. No.: WO2011/123009
PCT Pub. Date: Oct. 6, 2011

(65) Prior Publication Data
US 2013/0008214 A1    Jan. 10, 2013

(30) Foreign Application Priority Data
Mar. 29, 2010 (SE) ...................................... 1050295

(51) Int. Cl.
A44B 15/00    (2006.01)
(52) U.S. Cl.
USPC .................... 70/457; 70/458; D3/207; 24/3 K; 24/236
(58) Field of Classification Search
USPC ..... 70/456 R–459; 24/3 K, 236, 237; D3/207
See application file for complete search history.

(56) References Cited

U.S. PATENT DOCUMENTS

| | | | | |
|---|---|---|---|---|
| 448,892 A | * | 3/1891 | Staiger | 63/15.4 |
| 603,247 A | * | 5/1898 | Becker | 70/458 |
| 871,888 A | * | 11/1907 | Porter | 24/550 |
| 1,110,873 A | * | 9/1914 | Boye | 70/458 |
| 1,462,205 A | | 7/1923 | Korns | |
| 2,209,475 A | * | 7/1940 | Rawlings | 24/598.6 |
| 2,292,563 A | | 8/1942 | Imhoff | |
| 2,410,951 A | | 11/1946 | Leopold | |
| 4,176,534 A | * | 12/1979 | Denney | 70/408 |
| 4,891,961 A | | 1/1990 | Tsamas | |
| 4,951,361 A | | 8/1990 | Stephens | |
| 5,544,511 A | * | 8/1996 | Cavaleri | 70/457 |
| 7,093,468 B2 | * | 8/2006 | Song | 70/457 |
| D666,407 S | * | 9/2012 | Schoultz | D3/207 |

FOREIGN PATENT DOCUMENTS

WO    2007/138459 A3    12/2007

* cited by examiner

*Primary Examiner* — Suzanne Barrett
(74) *Attorney, Agent, or Firm* — Jeffrey S. Melcher; Manelli Selter PLLC

(57) ABSTRACT

This invention relates to a key ring, comprising a wire (2) arranged in at least two rounds (20,21,22) providing a resilient spiral (1), said spiral (1) having a first and a second end (23,24), wherein the first end (23) by means of inertial resiliency is forced to tightly contact a first surface (21 A) of a lower round (21) and the second end (24) is forced to tightly contact a second surface (20 B) of an upper round (20) wherein at least one end (23) is openable, by means of arranging a peak (3 A) providing a compressible gap (5) between said at least two rounds (20,21,22), wherein said wire (2) in at least one of the rounds, preferably all rounds, has a cross-section wherein the thickness (h) and width (w) is such that 2h<w<15h.

13 Claims, 2 Drawing Sheets

KEY RING WITH COMPRESSIBLE GAP

FIELD OF THE INVENTION

The present invention relates to a key ring, comprising a wire arranged in at least two rounds providing a resilient spiral, said spiral having a first and a second end, wherein the first end by means of inertial resiliency is forced to tightly contact a first surface of a lower round and the second end is forced to tightly contact a second surface of an upper round wherein at least one end is openable, by means of arranging a peak providing a compressible gap between said at least two rounds.

BACKGROUND INFORMATION

A key ring is a very well known and often used utility that plays an important part of the daily life to keep order of keys. To secure the keys most key rings are made relatively stiff and therefore hard to open, i.e. putting on a key may be rather cumbersome. Moreover, the stiffness may lead to nails breaking when attempting to open up a key ring. Accordingly there do exist disadvantage with this commonly used utility. Document WO2007/138459 discloses a solution attempting to solve the above problems. This known key ring comprises an open able ring, having a main portion, one or more intermediate portions and an end portion. The three parts are hinged to each other on a rotation axis perpendicular to the plane on which the ring lies. The second ends of the main portion and the end portion are equipped with removable mutual coupling means. All parts are each made with a succession of several plates piled up in a transversal direction and joined together through fixed coupling means. The ring described above has some drawbacks, e.g. the plates needs to be coupled to each other, in a relatively complex manner and the main, intermediate and end parts must be hinged to each other, which all require work and expenses.

From U.S. Pat. No. 2,292,563 there is known a key ring intended to be carried as a ring on a finger, for easily accessible storage of one key. This solution present some disadvantages, e.g. that one of the ends of the ring extends perpendicularly in relation to the spiral such that it protrudes, which may cause uncomfort and which also eliminates a key to pass over the ends.

From U.S. Pat. No. 1,462,205 there is known a key ring which will eliminate the customary thumb-nail method of attaching and detaching keys by having an oblique part and one end of the key ring is formed with a laterally projecting arc. This solution present some disadvantages, e.g. that it still needs some strength to get the key into the arc and the design is rather complex from a production perspective.

From U.S. Pat. No. 2,410,951 there is known a key ring which is opened by compressing a gap formed in the spiral, whereby both ends will pivot out to present opening where a key may be inserted. A disadvantage with this design is that both ends always will open up simultaneously, which is not needed and mostly not desired both because opening requires a relatively strong force and that the open end may catch onto something in an irritable or even damaging manner. Moreover, the design is relatively complex from a production perspective.

SUMMARY OF THE INVENTION

The object of the present invention is to minimize the problems mentioned above, which is achieved by means of a key ring according to claim 1.

Thanks to the invention there is provided an elegant and cost-efficient design that solves the above mentioned problem in a surprisingly efficient way.

BRIEF DESCRIPTION OF THE DRAWINGS

The invention will be described in more detail with reference to the appended figures, in which.

DETAILED DESCRIPTION OF THE PREFERRED EMBODIMENTS

The following detailed description, and the examples contained therein are provided for the purpose of describing and illustrating a certain embodiment of the invention only and are not intended to limit the scope of the invention in any way.

Figure 1:
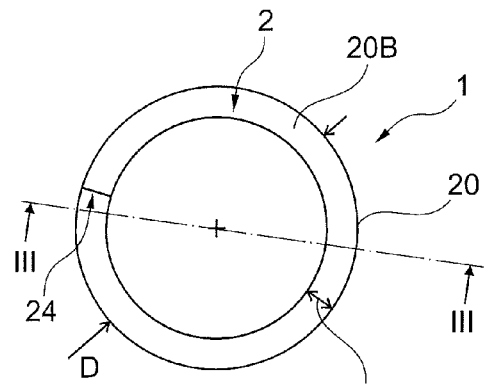
FIG. 1 shows a plan view of the key ring according to the invention, seen from above.

FIG. 1 shows a plan view of a key ring 1 made from a wire 2, twisted to form a spiral of at least two rounds 20, 21. In the figure there is presented one end 24 of the wire, which end 24 is forced to tightly contact an outwardly facing surface 20B of an upper round 20. The key ring 1 has an outer diameter D that is substantially larger than the width w of the wire 2.

Figure 2:
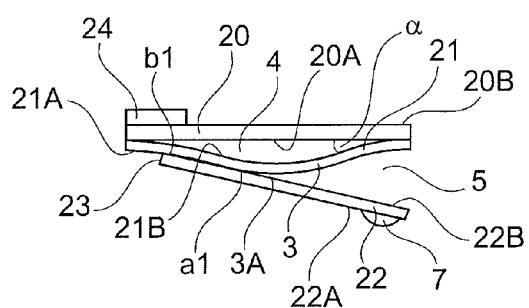
FIG. 2 shows a side view of the key ring in FIG. 1.
Figure 3:
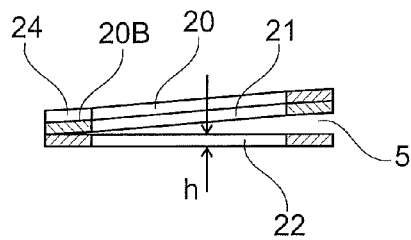
FIG. 3 shows a cross-sectional view along III-III in FIG. 1.

FIGS. 2 and 3 show the key ring 1 in a side view and cross-section respectively. It is shown that the wire 2 is twisted as a spiral, nearly three rounds 20, 21, 22, i.e. an upper round 20, and two subsequent lower rounds 21, 22 (in the following sometimes denoted intermediate round 21 and lowermost round 22). The wire 2 has a bend 3 on its second round 21 whereby there is created a peak 3A that gives rise to a relatively large gap 5 between the lower round 22 and the intermediate round 21. The bend 3 is created by means of bending the wire 2, in the intermediate round 21, to form a kind of a wide U, seen from the side. A kind of mean angle α of the extension of each "leg" of the U-shaped bend is between 20-60 degrees in relation to a plane containing the upper round 20, which forms a U-shaped gap 4 between the upper and the intermediate rounds 20, 21. The bend 3 extends about 60-100 degrees of the key ring's 1 circumference, which in turn will provide for the large gap 5 extending about 100-200 degrees of the key ring's circumference. Hence the design provides the advantage that merely one pivoting device/deformation is needed to obtain the large gap 5.

According to the shown embodiment the wire 2 has a width w that is bigger than the height h whereby the wires cross section is rectangular. The dimension may preferably be such that 2h<w<15h, more preferred 3h<w<12h. In a prototype that has successfully been tested the dimensions are h=0.5 mm, w=3.1 mm. Thanks to this design aspect several advantages are gained, e.g. high comfort during use (no disturbing edges, large pressing surfaces, a feeling of softness, etc) and a "dynamic" mode of operation, as will be explained more in detail below. The wire 2 is made of a strong and flexible material, e.g. stainless steel. By means of inertial resiliency a first end 23 is forced to tightly contact a first surface 21 A of a lower round (here 21), and a second end 24 is forced to tightly contact a second surface 20 B of the upper round. A lower surface 22 A of the lower round 22 may have a bulging part, a pressure device 7 that acts like a marker that identifies a point for compressing the key ring 1 to open up the first end 23. This pressure device 7 may e.g. be integrated with the wire 2.

Figure 4:
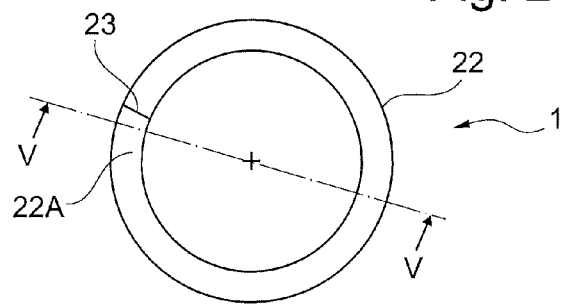
FIG. 4 shows the key ring according to the invention, seen from underneath.

FIG. 4 shows the key ring 1 turned around, seen from underneath, presenting the first end 23.

Figure 6:
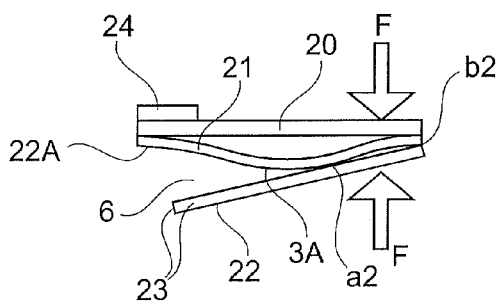
FIG. 6 shows a side view of the key ring according to the invention when a force is applied to open it.
Figure 5:
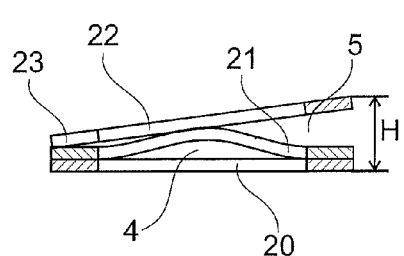
FIG. 5 shows a cross-sectional view along V-V in FIG. 4.

FIG. 5 shows the cross-section along V-V in FIG. 4, clearly presenting that a limited portion, about 40-60 degrees of the lowermost round 22 is in contact (at least partly) with the outwardly facing surface of the intermediate round, from the peak 3A to the end 23. It also clearly shows that the bend 3 makes a U-shaped inter space 4 between the upper round 20 and the intermediate 21 round, which in turn create the large gap 5. FIG. 6 shows a side view of the key ring when a force F is applied from both sides around the gap 5. Hence, when the gap 5 is compressed, e.g. by the fingers, the first end 23 opens up an insertion opening 6 for the key to be put into. Thereafter the key can be thread onto the key ring 1 in a traditional manner, i.e. along the rounds 22, 21, 20 until it leaves via the second end 24 to be secured within the key ring. Thanks to the design using a relatively thin and resilient/flexible material and a "soft" peak 3, the pivot points a, b will move in dynamic manner during compression of the gap 5. To start with (see FIG. 2) the lower starting pivot point a1 is positioned relatively close to the end 23 that opens up. During opening it moves along the peak 3 on the first surface 21 A of the intermediate round 21. During pivoting the pivot point a moves from one side to reach an end position a2 (see FIG. 6) on the other side of the U of the peak 3. In total the movement from a1 to a2 is about 5 to 20 degrees of the circumference of the spiral. The other starting pivot point b1 is also positioned on the first surface 21A of intermediate round 21 at a position that is about 180-270 degrees away from the peak 3A. During opening, this second pivot point b moves along the intermediate round 21 to reach an end position b2 (see FIG. 6) within a sector on an opposite side of the key ring, compared to the starting point b1. In total the movement from b1 to b2 is more than 90 degrees approximately about 180 degrees. This dynamic movement of the pivot points facilitates opening of one end 23 only, thanks to the flexibility/resiliency achieved by the design. When the force is decreased the insertion opening 6 shuts tight again and the key is safely retained between the neighboring rounds 21, 22. Thereafter the key can be thread onto the key ring 1 in a traditional manner, i.e. along the rounds 22, 21, 20 until it leaves via the second end 24 to be secured within the key ring. Also when removing a key, the same principle is used, i.e. by compressing the gap 5 the chosen key may easily be inserted into the spiral and thereafter removed in a traditional manner. Thanks to the design any of a number of keys may easily be chosen for removal, since the total height H (see FIG. 5) may easily be kept low enough to allow passing through the hole in a key handle/grip. Preferably the height H is about 3-6 mm, more preferred less than 5 mm, since the hole in a key handle/grip is normally 5-6 mm measured over the shortest distance. The width w of the wire 2 is also preferably smaller than the hole in the key handle/grip. In a preferred embodiment, the peak 3 is positioned such that the key ring 1 has a height of the large gap 5 that is approximately as high as twice the height of the U-shaped gap 4. Hence, in order to keep the total height H below the desired maximum of 5-6 mm, it is a great advantage to use a wire 2 having a limited height h.

Figure 7:
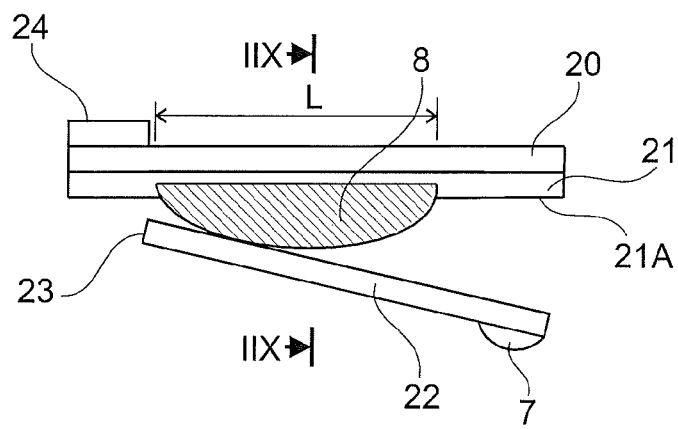
FIG. 7 shows an alternative embodiment of the key ring according to the invention.

FIG. 7 shows an alternative way of the key ring 1 where the intermediate round 21 is plane, in close contact with the upper round 20. Instead of bending the wire 2 the peak 3A is here created by a separate, solid body 8 that is attached to the first surface 21 A, e.g. by gluing, at the same place as the bend 3 described above. The body 8 has a convex upper surface, e.g. in the form of a semicircle that gives the same dynamic pivot points a, b as described above, during opening. The pressure device 7 described above may be in a form that it is squeezed onto the lower round 22 and is preferably bulging e.g. in the form of a droplet 7, which acts like a comfortable pressure point, and makes it easy to find the right spot. The body 8 has a length L in the interval 5-15 mm, more preferably 8-12 mm.

Figure 8:
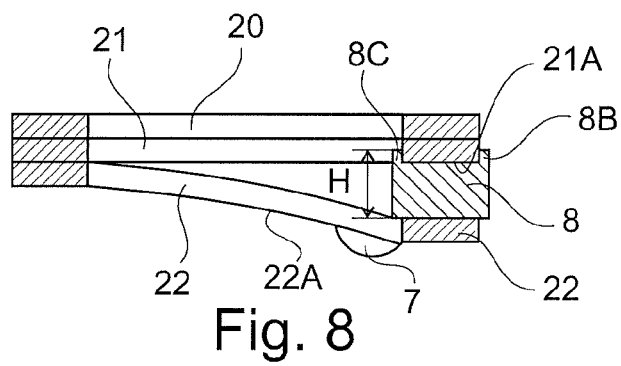
FIG. 8 shows a cross-sectional view along IIX-IIX in FIG. 7.

FIG. 8 shows a cross-section view along IIX-IIX in FIG. 7. It shows how the body 8 is in contact with the intermediate 21 and the lower 22 round and how the pressing device 7 is bulging from the surface 22A. The body 8 is preferably casted in one piece and preferably with two edges 8B, 8C on the side that lies against the first side 21 A which allows squeezing the body 8 onto the intermediate round 21. The body 8 may have a height H' in the interval 1-7 mm, more preferably 2-4 mm.

Figure 9:
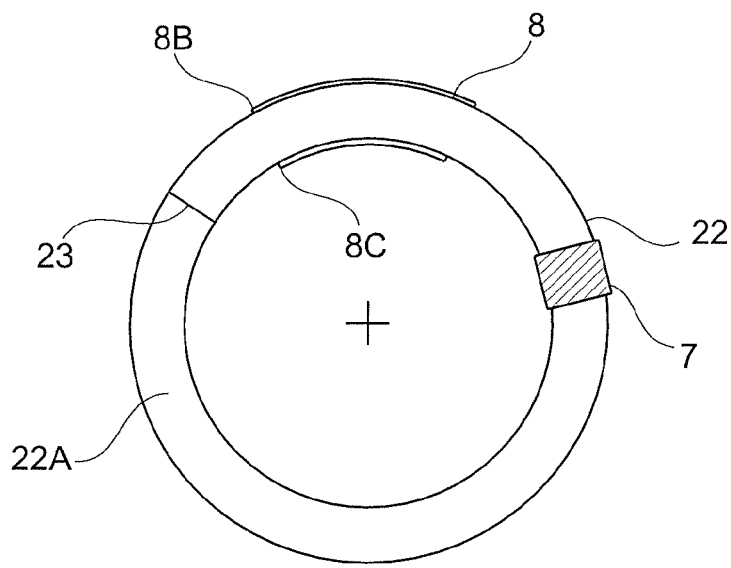
FIG. 9 shows the key ring in FIG. 7, seen from underneath.

FIG. 9 shows the key ring seen from underneath. The edges 8B, 8C of the body 8 is also seen from underneath and shows how they extends a little bit outside the key ring 1 and there is also seen that the pressing device 7 is arranged onto the surface 22A. The body 8 has a shape that follows the shape of the key ring when squeezed onto it. The body 8 extends about 60-100 degrees of the key ring's 1 circumference.

The invention is not delimited to the embodiment described above but can vary within the scope of the appended claims. For instance, the skilled person realizes that the peak 3A may be achieved in different ways, but still providing the functionality as mentioned above, e.g. instead of an angled second round there can be arranged a solid U-shaped body, e.g. by means of soldering, on the wire. Further, the wire can be twisted a variety of rounds, e.g. two or more than three rounds and yet fulfill the same basic function. Moreover, the cross section of the wire 2 can vary, (e.g. be circular and/or a partly flattened (i.e. substantially rectangular) wire) and also the material may vary, (e.g. a polymer, or a composite) and still fulfill the same basic function. It is also understood that with a more stiff material the wire may be thinner than the suggested intervals. The body 8 is preferably made of a polymer but may of course be made in other materials and still fulfill its purpose. The pressure device 7 may be arranged in other ways than described above e.g. by a roughened sticker or be excluded. Further it is evident that in the preferred embodiment the second opening 24, does not open up at all, but that within the scope of the claims it is to be understood that a design enabling a small opening (e.g. of about 25% of the insertion opening) is also to be seen as encompassing the invention.

The invention claimed is:

1. A key ring comprising:
a wire arranged in at least two rounds providing a resilient spiral, said spiral having a first and a second end, wherein the first end by means of inertial resiliency is forced to tightly contact a first surface of a lower round and the second end is forced to tightly contact a second surface of an upper round wherein at least one end is openable, by means of arranging a peak providing a compressible gap between said at least two rounds, wherein said wire in at least one of the rounds has a cross-section wherein the thickness (h) and width (w) is such that $2h \leq w \leq 15h$, wherein the combination of the position of peak and the form of the wire is arranged to enable said first end to open up an insertion opening when compressing said gap, and not to enable said second end to open up an insertion opening.

2. The key ring according to claim 1, wherein the wire in all of the rounds has a cross-section wherein the thickness (h) and width (w) is such that $2h \leq w \leq 15h$.

3. The key ring according to claim 1, wherein said peak extends about 40-60 degrees of the full circle.

4. The key ring according to claim 1, wherein said compressible gap is arranged to extend longer than the extension of said peak.

5. The key ring according to claim 1, wherein said wire is twisted at least one and a half round.

6. The key ring according to claim 1, wherein said wire is twisted at least two rounds.

7. The key ring according to claim 1, wherein said wire in at least one of the rounds has a cross-section wherein $3h \leq w \leq 12h$.

8. The key ring according to claim 1, wherein said wire in all of the rounds has a cross-section wherein $3h \leq w \leq 12h$.

9. The key ring according to claim 1, wherein the height (h) is between 0.2-1.5 mm.

10. The key ring according to claim 1, wherein the height (h) is between 0.25-1 mm.

11. The key ring according to claim 1, wherein said compressible gap is arranged to extend about 100-200 degrees.

12. A key ring comprising a wire arranged in at least two rounds providing a resilient spiral, said spiral having a first and a second end, wherein the first end by means of inertial resiliency is forced to tightly contact a first surface of a lower round and the second end is forced to tightly contact a second surface of an upper round wherein at least one end is openable, by means of arranging a peak providing a compressible gap between said at least two rounds, wherein said wire in at least one of the rounds has a cross-section wherein the thickness (h) and width (w) is such that $2h \leq w \leq 15h$, wherein said peak creates a U-shaped gap between two adjacent rounds.

13. The key ring according to claim 3, wherein said peak is provided by means of a bend on a round other than the round containing said first end.

* * * * *